United States Patent [19]
Van Gompel

[11] 3,754,516
[45] Aug. 28, 1973

[54] PARALLEL MOTION MECHANISM

[75] Inventor: James J. Van Gompel, Fremont, Ind.

[73] Assignee: Brammall, Inc., Angola, Ind.

[22] Filed: Dec. 23, 1970

[21] Appl. No.: 100,865

[52] U.S. Cl. .......................... 105/369 B, 105/369 S
[51] Int. Cl. ........................ B61d 45/00, B60p 7/14
[58] Field of Search ..................... 105/369 B, 369 S, 105/369 U, 376; 254/93 R

[56] References Cited
UNITED STATES PATENTS

| | | | |
|---|---|---|---|
| 3,606,842 | 9/1971 | Verbick | 105/369 S |
| 2,507,769 | 5/1950 | Churchill | 105/369 S |
| 2,529,588 | 11/1950 | Beckett | 105/369 S |
| 1,085,285 | 1/1914 | Monesmith | 105/369 B |
| 1,833,016 | 11/1931 | Chandler | 105/369 S |
| 3,333,553 | 8/1967 | Krokos | 105/369 B |
| 1,911,734 | 5/1933 | Wyrick | 105/369 S |
| 2,674,207 | 4/1954 | Kerbaugh et al. | 105/376 |
| 2,827,960 | 3/1958 | Keating et al. | 105/369 B |
| 3,212,458 | 10/1965 | Robertson | 105/369 S |

*Primary Examiner*—Drayton E. Hoffman
*Attorney*—Hood, Gust, Irish, Lundy & Coffey

[57] ABSTRACT

A parallel motion mechanism particularly suited for use as an adjustable retainer for blocking and bracing loads in cargo-carrying vehicles, such as railroad cars, semi-trailers, ships, airplanes and containers. The mechanism in its basic form comprises a pair of elongated, rigid members which are relatively laterally movable between a collapsed position and an extended position, and a connecting linkage which at all times maintains the members in parallel relationship. The connecting linkage comprises a pair of longitudinally spaced-apart toggle linkages each comprising four equal-length links having their ends pivotally connected to form a parallelogram, two opposite pivot points of the parallelogram being respectively pivotally connected to the two members. A guiding linkage is provided comprising a pair of elongated guide elements respectively extending between and pivotally connected to corresponding ones of the remaining pivot points of the two toggle linkages and being guided for relative collinear extension and retraction in response to movement of the toggle linkages between collapsed and the extended positions thereby maintaining the two members in parallel relationship. In one embodiment, the two guide elements may be clamped together in any position of the mechanism between fully collapsed and fully expanded thereby locking the mechanism so as rigidly to block and brace a load within a vehicle. In another embodiment, the two members may be resiliently urged toward their expanded position thereby resiliently to brace a load within a vehicle.

26 Claims, 24 Drawing Figures

PATENTED AUG 28 1973

INVENTOR:
JAMES J. VAN GOMPEL,

BY Wood, Herst, Irish, Lundy & Coffey
ATTORNEYS.

PARALLEL MOTION MECHANISM

BACKGROUND OF THE INVENTION

1. Field of the Invention

This invention relates generally to parallel motion mechanisms, and more particularly to an adjustable retainer for use in blocking and bracing loads in cargo-carrying vehicles.

2. DESCRIPTION OF THE PRIOR ART

Many different types of loads carried on or in cargo-carrying vehicles, such as heavy machinery, large rolls or coils, and paletized cartons or boxes, require blocking and bracing in order to inhibit shifting of the load in transit with consequent damage to the load and/or vehicle. While it is generally desired to prevent lateral shifting of the load, limited longitudinal shifting of certain heavy loads may be permitted. It has been the practice for many years to block and brace loads on or in vehicles with lumber, referred to as dunnage, which is manually cut to size and nailed to the floor and/or walls of the vehicle. Substantial material cost is involved and most, if not all, of the dunnage is unusable and thus scrapped after one use. Further, substantial labor cost is involved both in initially constructing the blocking and bracing and in removing the same at the delivery point. Still further, substantial time is required for constructing and removing conventional blocking and bracing which in turn may involve substantial demurrage charges on the freight car. Finally, repeated installation of conventional blocking and bracing results in damage to the floor and/or walls of the vehicle thus requiring periodic repair and replacement.

Various types of mechanical devices have been proposed for blocking and bracing loads in or on vehicles. Some of these prior devices are designed for use with a specific type of a load and thus do not have universal application. Others are characterized by their complexity and thus relatively high cost. One form of adjustable load retaining mechanism is shown in U.S. Pat. No. 3,606,842 of Basil G. Verbick. That mechanism includes a pair of members for respectively abutting the load and a wall of the vehicle and which are interconnected by a pivotally coupled linkage forming a pair of parallelograms respectively coupled to the two members and to each other. The mechanism of the Verbick application is not infinitely adjustable between fully collapsed and fully extended positions but on the contrary is adjustable only in discrete, spaced increments and further, the mechanism does not automatically maintain the two members in parallel relationship in every adjusted position thereof which is a desirable feature of an adjustable load retaining mechanism. Still further, the mechanism of the Verbick application does not include means for resiliently accommodating or restraining either lateral or longitudinal shifting of the load nor for centering a load which has become misaligned due to jostling in transit.

It is accordingly desirable to provide a parallel motion mechanism and in particular an adjustable load retainer incorporating such mechanism which is infinitely adjustable between fully collapsed and fully expanded positions and in which the load and vehicle engaging members are at all times maintained in parallel relationship. It is further desirable that such a mechanism be capable of resiliently accommodating and restraining lateral and/or longitudinal shifting of a load and of self-centering of a mis-aligned load.

SUMMARY OF THE INVENTION

The invention, in its broader aspects, provides a parallel motion mechanism comprising a pair of spaced toggle linkages. Each of the linkages has four link elements pivotally connected together at first and second opposite pivot points and at third and fourth opposite pivot points to form a parallelogram. First means is provided interconnecting the first pivot points for movement in unison, and second means is provided interconnecting the second pivot points for movement in unison. Means is provided for connecting the third pivot points to a first rigid structure, and means is provided for connecting the fourth pivot points to a second rigid structure. The link elements are of such lengths and the pivot points are so located that the first and second pivot points are located on a first imaginary straight line and the third and fourth pivot points are respectively located on second and third imaginary straight lines spaced on opposite sides of the first line and parallel therewith in all angular positions of the linkages. Means may be provided for clamping the first and second interconnecting means thereby locking the linkages in any of an infinite number of adjusted positions between fully collapsed and fully extended, and means may be provided for resiliently urging the linkages toward their expanded position.

It is accordingly an object of the invention to provide an improved parallel motion mechanism which is infinitely adjustable between fully collapsed and fully extended positions.

Another object of the invention is to provide an improved adjustable retaining mechanism for blocking and bracing a load in a cargo-carrying vehicle or container.

A further object of the invention is to provide an improved load retaining mechanism which will resiliently accommodate and restrain both lateral and longitudinal shifting of a load.

Yet another object of this invention is to provide an improved load retaining mechanism which will automatically center a load which has become misaligned in transit.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENTS

Figure 1:
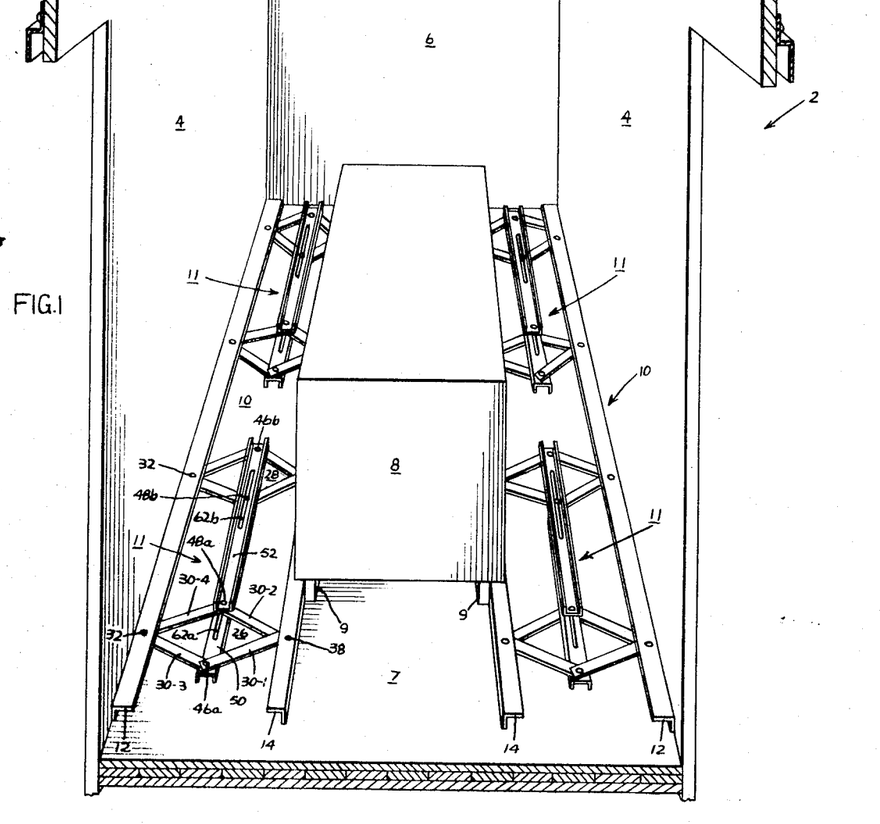
FIG. 1 is a view in perspective showing one embodiment of the invention bracing a load in a conventional railroad boxcar.

Referring now to FIG. 1 of the drawings, there is shown a conventional railroad boxcar 2 having side walls 4, end wall 6 and floor 7. Load 8 supported on stringers 9 is laterally, rigidly braced from side walls 4 by adjustable retainer assemblies 10 which rest upon floor 7. In the illustrated embodiments each of the adjustable retainer assemblies 10 comprises a pair of parallel motion mechanisms 11 of the invention.

Figure 2:
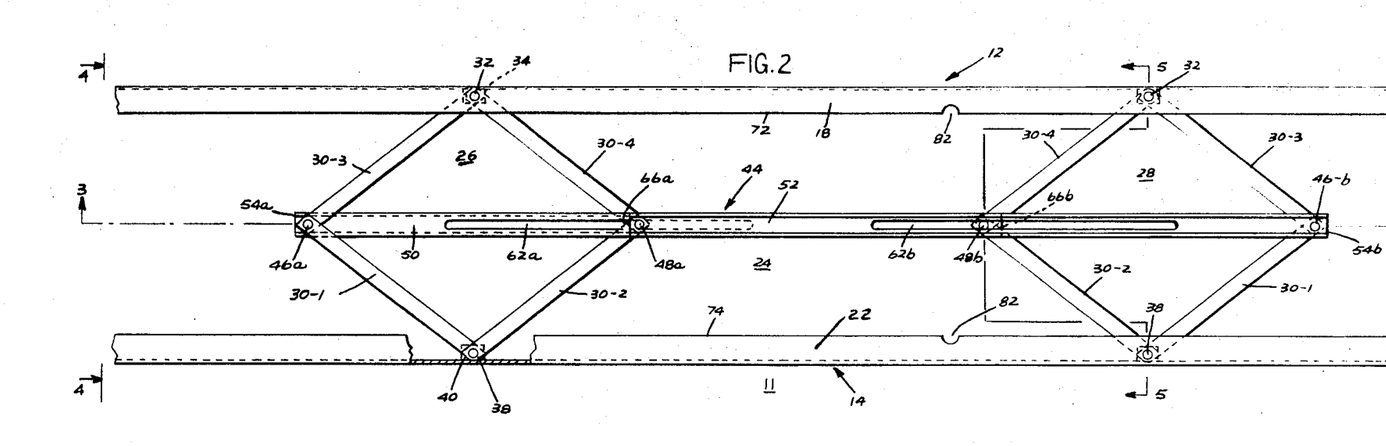
FIG. 2 is a top view of the embodiment of the parallel motion mechanism shown in FIG. 1.
Figure 3:
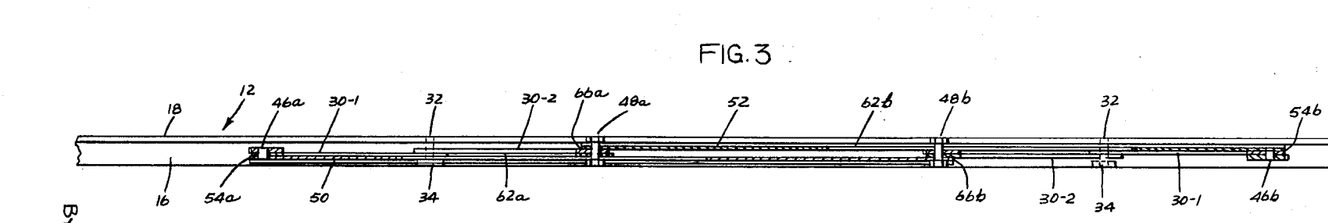
FIG. 3 is a longitudinal cross-sectional view taken generally along line 3—3 of FIG. 2.
Figure 4:
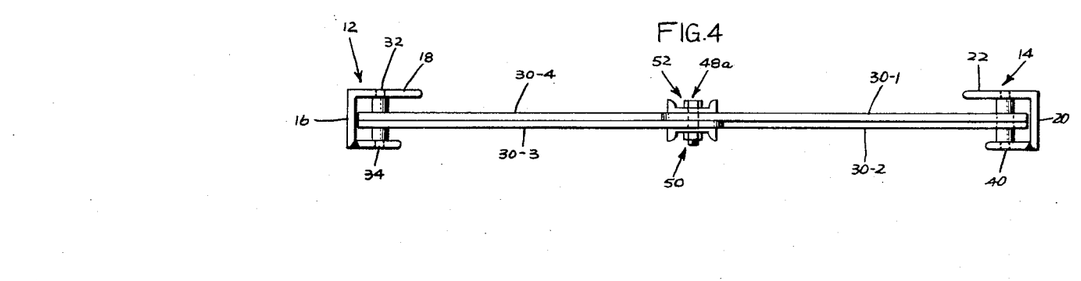
FIG. 4 is an end view taken generally along line 4—4 of FIG. 2.
Figure 5:
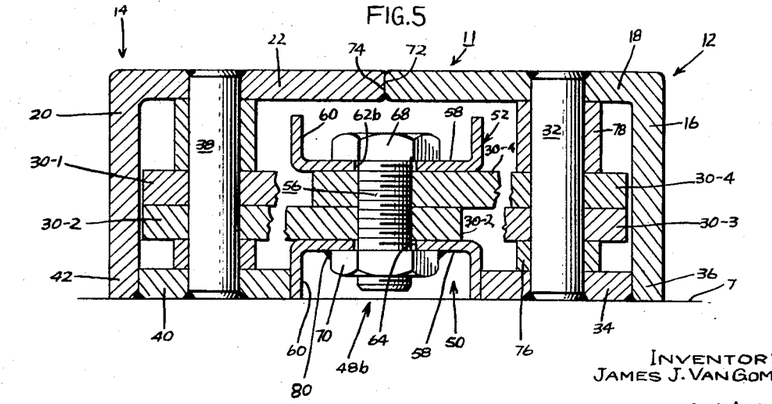
FIG. 5 is an enlarged, transverse cross-sectional view taken generally along the line 5—5 of FIG. 2 showing the mechanism in its fully collapsed position and further showing the locking mechanism.

Referring now additionally to FIGS. 2 through 5, in this embodiment parallel motion mechanism 11 comprises a pair of elongated angle members 12, 14, member 12 having side flange 16 adapted to be abutted against wall 4 and top flange 18, and member 14 having side flange 20 adapted to be abutted against stringer 9 and also having top flange 22. Linkage 24 connects members 12 and 14 providing for infinite adjustment of the members between a fully expanded position (FIGS. 1 and 2 show a partially expanded position of the mechanism) and a fully collapsed position, as shown in FIG. 5, linkage 24 further maintaining members 12, 14 in parallel relationship in all of their infinite number of positions between fully collapsed and fully expanded. In this embodiment, connecting linkage 24 may be locked in any position between fully collapsed and fully expanded.

Connecting linkage 24 comprises a pair of identical toggle linkages 26, 28. Each of the toggle linkages 26, 28 comprise four equal-length links 30-1, 30-2, 30-3, and 30-4 pivotally connected at their ends to form a parallelogram. The outer ends of links 30-3, 30-4 are pivotally connected together and to member 12 by pivot pin 32 extending between flange 18 and plate 34 secured to bottom end 36 of flange 16, as by welding, as best seen in FIG. 5. Pivot pin 32 is secured to flange 18 and plate 34, as by welding. The outer ends of links 30-1, 30-2 are similarly pivotally connected to each other and to member 14 by pivot pin 38 secured to flange 22 and plate 40, as by welding, plate 40 being secured to bottom end 42 of flange 20, as by welding. As best seen in FIG. 5, bottom ends 36, 42 of flanges 16, 20, respectively, and plates 34, 40 support mechanism 11 on floor 7.

Guiding linkage 44 interconnects the remaining pivot elements 46a, 48a and 46b, 48b of toggle links 26, 28. Guiding linkage 44 comprises a pair of elongated guide elements 50, 52 respectively extending between and interconnecting corresponding pivot elements of toggle linkages 26, 28. Thus, element 50 extends between and is pivotally connected to pivot elements 46a and 48b, and element 52 extends between and is pivotally connected to pivot elements 46b and 48a. Pivot elements 46a, 46b are pins pivotally connecting the inner ends of links 30-1, 30-3 of toggle linkages 26, 28 to each other and to outer ends 54a, 54b of elements 50, 52. In this embodiment, pivot elements 48a, 48b are threaded fasteners 56 (FIG. 5).

Elements 50, 52 are preferably channel members respectively having web portions 58 and side flange portions 60. Elongated slots 62a, 62b are respectively formed in web portions 58 of elements 50, 52. Referring particularly to FIG. 5, threaded fastener 56 which comprises pivot element 48b extends through opening 64 in web portion 58 of element 50 adjacent end 66b and through slot 62b in web portion 58 of element 52, head 68 of fastener 56 engaging web portion 58 of element 52 and nut 70 engaging web portion 58 of element 50. In similar fashion, threaded fastener 56 which comprises pivot element 48a extends through an opening in web portion 58 of element 52 adjacent its end 66a and through slot 62a in web portion 58 of element 50. A pad or washer (not shown) may be positioned between bolt head 68 and web portion 58 of channel 52 in the same manner as pad 93 shown in FIG. 6 in order to inhibit spreading of slot 62 when the bolt is tightened.

It will now be seen that with threaded fasteners 56 loosened (but not sufficiently to disengage nuts 70), the cooperative relationship of threaded fasteners 56 with slots 62a, 62b in guide elements 50, 52 provides for colinear movement of elements 50, 52 between retracted and extended positions as members 12, 14 are relatively moved laterally between fully collapsed and fully extended positions. Importantly, elements 50, 52 maintain constant, equal spacing between pivot elements 46a and 48b on the one hand, and 46b and 48a on the other, thus maintaining members 12, 14 in parallel relationship throughout their movement between their fully collapsed and fully extended positions. It will further be seen that prior to tightening threaded fasteners 56, members 12, 14 are infinitely adjustable between their fully collapsed and fully extended positions. Members 12, 14 may selectively be locked in any desired position between fully retracted and fully extended by merely tightening threaded fasteners 56 so that heads 68 (or the pads or washers if employed) and nuts 70 tightly engage web portions 58 of elements 50, 52 thereby clamping the inner ends of links 30-2, 30-4 between web portions 58, as will clearly be seen in FIG. 5. Referring to FIG. 1, with threaded fasteners 56 loosened, members 12, 14 may be manually spread apart until members 12 engage walls 4 and members 14 engage stringers 9. Fasteners 56 may then be tightened thereby securely to lock adjustable retainer 10 in its load-bracing position. It will clearly be seen that once elements 50, 52 are locked by threaded fasteners 56, members 12, 14 cannot be moved toward the collapsed position without stretching element 50 between pin 46a and threaded fastener 56 comprising pivot element 48a, stretching element 52 between pin 46b and threaded fastener 56 comprising pivot element 48b, and buckling elements 50, 52 between the two threaded fasteners 56 respectively comprising pivot elements 48a and 48b, simultaneously. The reverse condition applies should an effort be made to expand members 12, 14 when elements 50, 52 are so locked.

Still referring to FIG. 5, in the preferred embodiment, edges 72, 74 of flanges 18, 22 of members 12, 14 are abutting in the fully collapsed position of the adjustable retainer with flanges 18, 22 thus presenting a smooth, flat upper surface so as to prevent damage to any articles or commodities which may be resting thereon. It will further be observed that the bottom edges of side flanges 60 of element 50 rest upon floor 7 thereby supporting guiding linkage 44. Sleeves 76, 78 on pins 32, 38 appropriately space links 30-3 and 30-4 between flange 18 and member 34, and links 30-1 and 30-2 between flange 22 and member 40. Nut 70 may be captured to prevent loss by being welded to web portion 58 of element 50, as at 80. In order to provide access to head 68 for locking and unlocking the adjustable retainer in its fully collapsed position, notches 82 are provided in edges 72, 74 of flanges 18, 22, notches 82 being aligned with head 68 of threaded fastener 56 when members 12, 14 are in their fully collapsed position.

Figure 6:
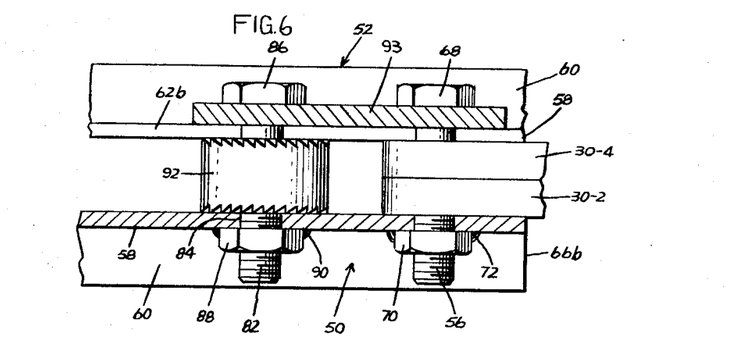
FIG. 6 is a fragmentary side, cross-sectional view illustrating a modification of the locking mechanism of the embodiment of the previous figures.

In a specific embodiment of the adjustable retainer, the various members and elements had the following dimensions:

Flanges 16, 20 — 2 inches high, ¼ inch thick
Flanges 18, 22 — 2-½ inches wide, ¼ inch thick
Pins 32–38 — 2 inches long, ½ inch diameter
Sleeves 76 — ¼ inch long
Sleeves 78 — five-eighths inch long
Links 30 — 17-7/8 inches long, five-sixteenths inch thick
Web portions 58 — 1-3/4 inches long, three-sixteenths inch thick
Flange portions 60 — one-half inch high, three-sixteenths inch thick Referring now briefly to FIG. 6, if additional locking force is required in order to lock mechanism 11 in any of its infinite number of positions between fully collapsed and fully expanded, an additional threaded fastener 82 may be provided extending through slot 62b in web portion 58 of element 52 adjacent threaded fastener 56 which comprises pivot element 48b, and through an additional opening 84 in web portion 58 of element 50 with its head 86 engaging pad 93 which, in turn, engages web portion 58 of element 52, and with nut 88 engaging web portion 58 of element 50, nut 88 preferably being captured by welding as at 90. Serrated spacer 92 is positioned on threaded fastener 82 between web portions 58 of elements 50, 52 and having the same thickness as the combined thickness of links 30-2, 30-4 which are pivotally connected by threaded fastener 56. It will thus be seen that tightening threaded fastener 82 will clamp web portions 58 of elements 50, 52 against serrated spacer 92 thereby providing increased friction so as to provide additional locking force.

Figure 7:
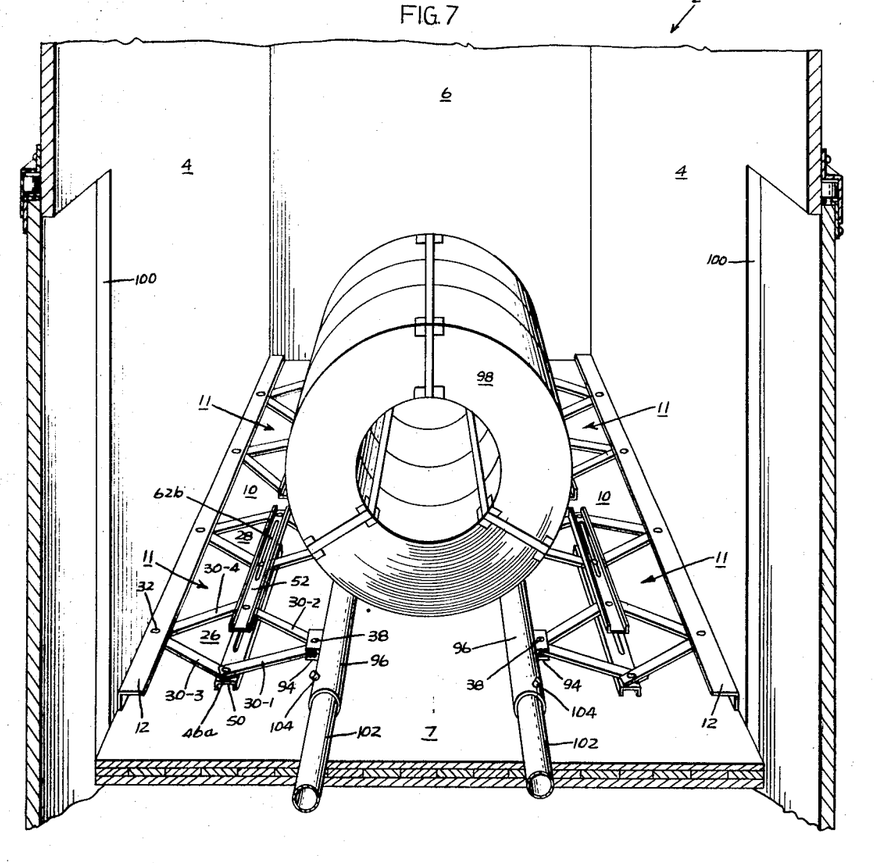
FIG. 7 is a perspective view of a conventional railroad boxcar illustrating another type of load braced and blocked in the car by the adjustable retainer of the invention, and further illustrating telescoping door extenders.

Referring now to FIG. 7 in which like elements are indicated by like reference numerals, here the elongated angle member 14 of adjustable retainer 10 of FIG. 1 is replaced by relatively short, individual channel members 94 which with pivot pins 38 pivotally connect the outer ends of links 30-1, 30-2 of toggle linkages 26, 28. Members 94 are in turn secured, as by welding, to elongated tubular members 96 which respectively engage and rigidly brace load 98 against lateral movement, load 98 being shown as comprising large coils of sheet material, such as sheet steel, tin plate or the like.

In this embodiment, the area of floor 7 which extends across door openings 100 is spanned by tubular elements 102 telescoped within tubular members 96 and adjustably secured thereto, as by threaded fasteners 104. It will be understood that tubular members 102 are similarly telescoped within tubular elements 96 of another pair of adjustable retainers 10 positioned at the opposite end of the car 2 (not shown).

It will be further understood that the single elongated member 12 also may be replaced by individual channel members similar to members 94 which may be secured to another elongated element having any desired configuration, such as tubular, or which may be secured to an elongated, flat, rigid structure such as a wall or floor.

Figure 8:
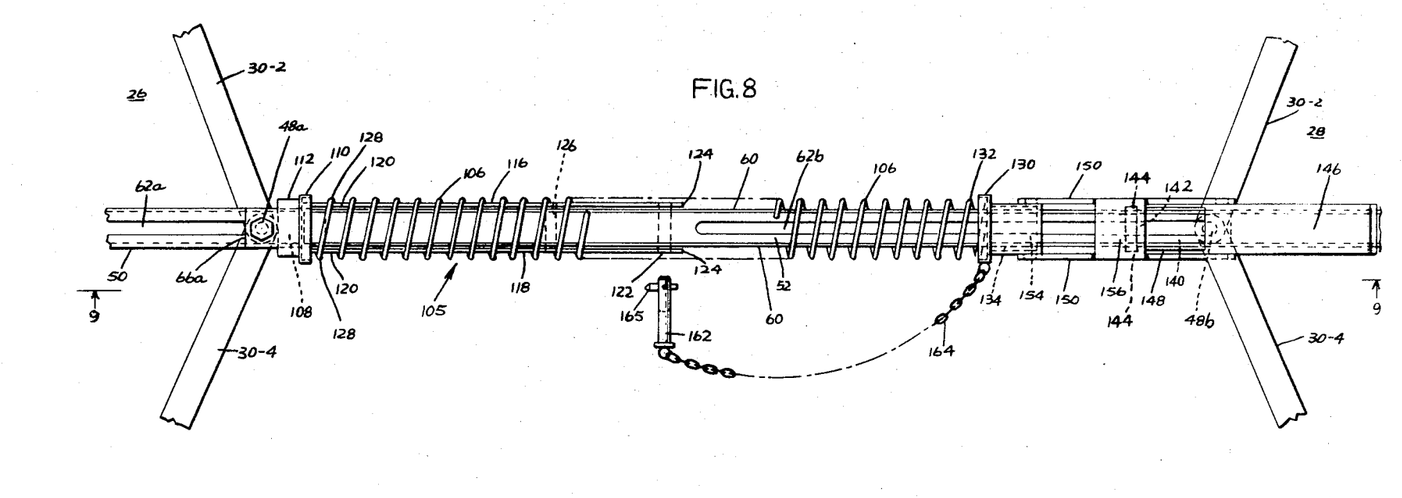
FIG. 8 is a fragmentary top view showing another embodiment of the parallel motion mechanism of the invention incorporating a spring for urging the mechanism into its fully expanded position and a manually-actuated linkage for compressing and disengaging the spring.
Figure 9:
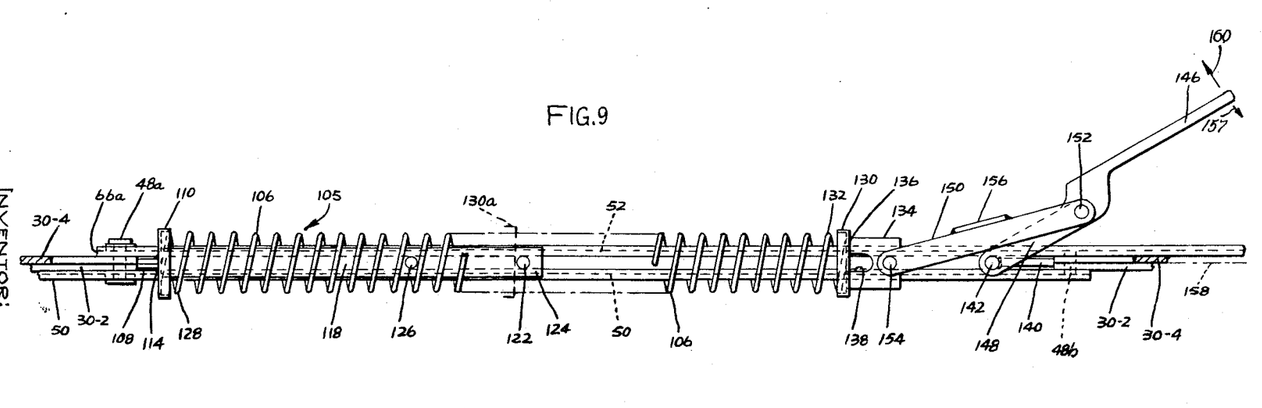
FIG. 9 is a side view, partly in cross-section, taken generally along the line 9—9 of FIG. 8.

Referring now to FIGS. 8 and 9 in which like elements are again indicated by like reference numerals, there is shown an embodiment of the invention wherein the mechanism 105 is resiliently expanded toward its fully extended position by coil spring 106 surrounding guide elements 50, 52 between pivot elements 48a, 48b, means being provided for compressing the spring and retaining it in compressed position so as to permit collapsing of the mechanism. Here, pivot elements 48a, 48b comprise pins rather than the threaded locking fasteners 56 of the previous embodiment. Spacer block 108 is positioned between guide elements 50, 52 and abuts the curved inner ends of links 30-2, 30-4. Spring retaining cup 110 surrounds elements 50, 52 and is secured to projecting ears 112 of block 108, as by welding at 114.

Side bars 116, 118 extend on either side of guide elements 50, 52, having their inner ends 120 secured to the inner surface of cup 110, as by welding, and having transversely aligned pin receiving openings 122 formed therein adjacent their outer ends 124. Spacer pin 126 is seated in transversely aligned openings in side bars 116, 118, being secured thereto, as by welding, and extends transversely between side bars 116, 118 and between guide elements 50, 52. Spring 106 surrounds side bars 116, 118 and its end 128 abuts cup 110.

Another spring retaining cup 130 surrounds guide elements 50, 52 and is abutted by end 132 of spring 106. A hollow pusher member 134 is telescoped on guide elements 50, 52 and has forward end 136 adapted to engage cup 130, forward end 136 having slot 138 formed therein. Reaction block 140 is positioned between guide elements 50, 52 and engages the curved inner ends of links 30-2, 30-4 of toggle linkage 28. Reaction block 140 has pivot pin 142 secured thereto extending between guide elements 50, 52 and having outer ends 144 respectively extending slightly beyond side flanges 60. Actuating handle member 146 is provided having a pair of arms 148 straddling guide elements 50, 52 and respectively pivotally connected to ends 144 of pin 142. A pair of links 150 are provided on either side of arms 148, links 150 being pivotally connected to handle 146 by pivot pin 152 and to pusher member 134 by pivot pin 154 which extends transversely between guide elements 50, 52. Web element 156 extends across links 150 and is secured thereto, as by welding.

It will now be seen that spring 106 normally biases pivot pins 48a, 48b apart thereby resiliently forcing the mechanism toward its expanded position, the force exerted by spring 106 causing handle 146 to be pivoted downwardly in the direction shown by the arrow 157 until pin 152 is just above center line 158 of guide elements 50, 52. It is thus seen that handle member 146 is retained in its lowered position by the force exerted by spring 106, web 156 preventing links 150 from bowing by reason of the force exerted by spring 106.

When it is desired to collapse the mechanism, handle member 146 is manually raised from its lowered position, as shown by arrow 160, thus causing links 150 to move pusher member 134 and cup 130 toward pivot element 48a thus compressing spring 106. When handle member 146 has been pivoted in direction 160 by close to 180°, links 150 have moved pusher member 134 and cup 130 forwardly to the position shown by the dashed lines at 130a in FIG. 9. At this point, pin 162 (FIG. 8) is inserted through slot 138 in pusher member 134 and through openings 122 in side bars 116, 118, and may be retained in position by pivoted end 165. Pin 162 may be attached to cup 130 by chain 164 to prevent loss of the pin. Pin 162 when thus inserted in openings 122 retains cup 130 in its position 130a thus retaining spring 106 compressed. Handle member 146 may then be returned to its original, lowered position, and the retainer mechanism may then be manually collapsed. When it is desired to expand the mechanism, handle member 146 is again actuated to its forward position with pusher member 134 in engagement with cup 130 in its position 130a and pin 162 is then removed thus permitting spring 106 to expand thereby pivoting handle member 146 rearwardly in direction 157 and resiliently expanding the retainer mechanism.

Figure 10:
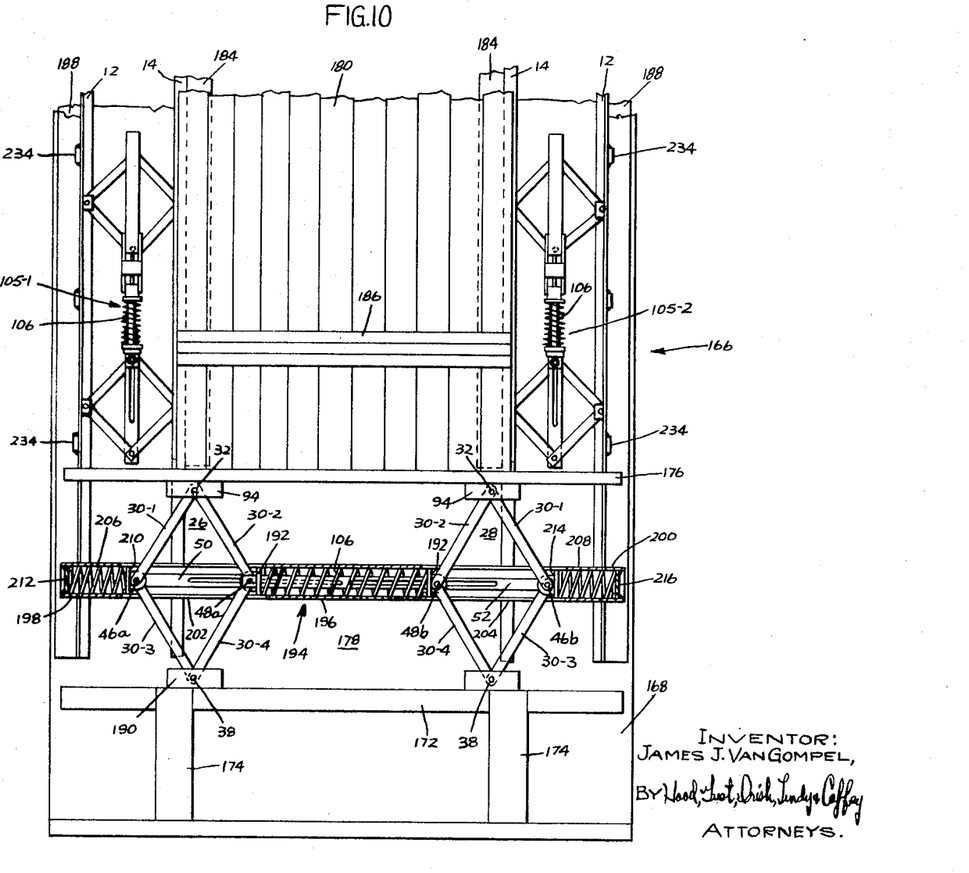
FIG. 10 is a fragmentary top view showing a conventional railroad flat car showing side bracing of a load with embodiments of the mechanism of the invention as illustrated in FIGS. 8 and 9, and end blocking of the load with another embodiment of the invention incorporating springs for urging the mechanism to its fully expanded position, the latter being shown in cross-section.
Figure 11:
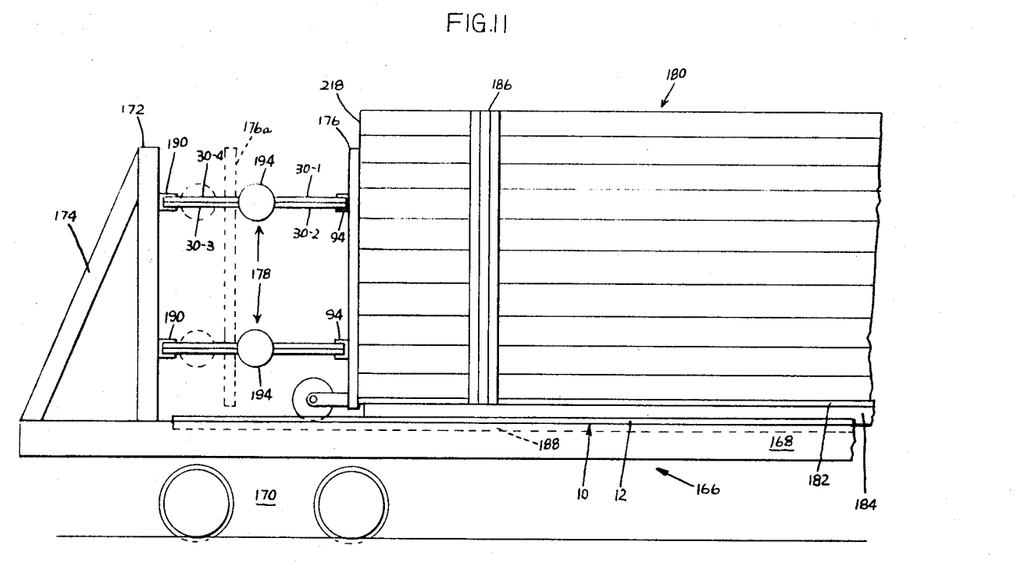
FIG. 11 is a fragmentary side view of the railroad flat car shown in FIG. 10.

Referring now to FIGS. 10 and 11, in which like elements are again indicated by like reference numerals, there is shown a conventional railroad flat car 166 having a flat bed body 168 supported on conventional trucks 170. Conventionally, rigid end wall or bulkhead 172 extends upwardly adjacent each end of the car, being braced by members 174. Movable bulkhead 176 is resiliently urged away from fixed bulkhead 172 by a pair of retainers incorporating another embodiment of the invention shortly to be desribed. Load 180, shown here as being lumber, is supported on pallet 182 having skids 184, load 180 being secured to pallet 182 in conventional fashion as by banding 186.

A pair of elongated recesses 188 are formed in bed 168 adjacent the side edges thereof and adjustable retainers incorporating the spring-biased mechanism 105, as shown in FIGS. 8 and 9, are respectively hingedly mounted for movement between storage positions in recesses 188 and active positions in the manner shown in FIG. 12 and hereinafter described.

Retainers 178 each comprise the pair of toggle linkages 26, 28 and the slotted guide elements 50, 52 of the previous embodiments. Links 30-1, 30-2 of toggle linkages 26, 28 are respectively pivotally connected by pivot pins 32 to relatively short channel members 94 which are secured to movable bulkhead 176, as by lag bolts. Links 30-3 and 30-4 of toggle linkages 26, 28 are respectively pivotally connected by pivot pins 38 to relatively short channel members 190 which are similarly secured to fixed bulkhead 172.

Spring 106 again surrounds guide elements 50, 52 and has its opposite ends engaging spring seat members 192 which, in turn, respectively engage the rounded inner ends of links 30-2, 30-4 of toggle linkages 26, 28. An elongated tube 194 is provided having a central portion 196, end portions 198, 200, and slots 202, 204 through which links 30-1, 30-2, 30-3, and 30-4 of toggle linkages 26, 28 extend, as best seen in FIG. 10. Springs 206, 208 are respectively positioned in end portions 198, 200 of tube 194, spring 206 bearing against spring seat 210 and plug 212 which closes end 198 of tube 194, and spring 208 bearing against spring seat 214 and plug 216 which closes end 200 of tube 194. It will be seen that springs 106, 206 and 208 at all times resiliently urge mechanism 178 toward its fully extended position.

It will now be seen that spring loaded retainers 105 resiliently, laterally brace load 180, any tendency for load 180 to shift to one side or the other, for example toward the left as viewed in FIG. 10, being resiliently resisted and accommodated by movement of retainer 105-1 toward its collapsed position against the force exerted by spring 106 with the other retainer 105-2 being correspondingly urged toward its expanded position under the influence of its spring 106. Retainers 178 at the opposite ends of the car act as buffers being normally fully expanded so that movable bulkheads 176 engage the opposite ends 218 of load 180. Thus, if load 180 tends to shift longitudinally, for example toward the left as viewed in FIG. 11, it will move away from bulkhead 176 and retainers 178 at the opposite end of the car (not shown) and resiliently compress retainers 178 by moving movable bulkhead 176 toward fixed bulkhead 172, as shown in dashed lines at 176a in FIG. 11. Thus, a heavy load is permitted to float longitudinally of car 166, such longitudinal floating being limited by retainers 178 at each end of the car which act as buffers.

The normal vibration of car 166 in transit may also result in load 180 tending to be jostled to an angular position with respect to the longitudinal axis of car 166. The spring loaded retainers 105 act to resist and correct this tendency so as to maintain the load in the desired position in parallel relationship with the axis of the car. The spring load retainers 105 thus provide both a self-centering action tending to maintain the load centered on the vehicle, and also a self-aligning action tending to straighten the load.

It will be readily understood that for other types of loads where the self-centering and self-aligning action of the springloaded retainers 105 is not required, the locked embodiment of the retainer shown in FIGS. 1 through 5 may be employed.

Figure 12:
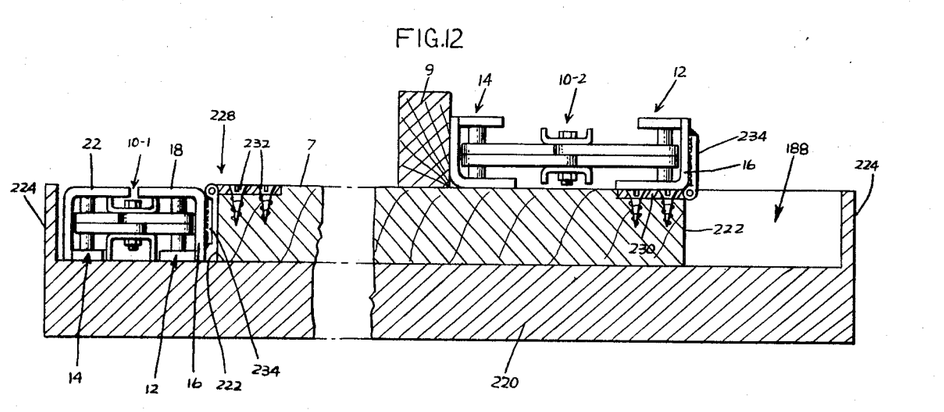
FIG. 12 is a cross-sectional view of a conventional railroad car having the adjustable retainer of the invention mounted in recesses in the floor of the car for pivotal movement between a storage position and an operating position.

Referring now to FIG. 12 in which like elements are still indicated by like reference numerals, there is shown the steel floor 220 of a conventional railroad car having wood floor 7 mounted thereon. Side edges 222 of floor 7 are spaced from upstanding side walls 224 of floor 220 to define longitudinally extending side recesses 188. Adjustable retainers 10 are secured to floor 7 by elongated piano-type hinges 228 each having hinge plate 230 secured to floor 7 by suitable lag screws 232 and hinge plate 234 secured to flange 16 of member 12, as by welding. It will thus be seen that when the retainer is fully collapsed, it can be pivoted into recess 188, as shown in the case of retainer 10-1 in FIG. 12. When it is desired to employ the adjustable retainers, they may be pivoted out of recesses 188 and extended to engage stringer 9 which supports a load, as shown in the case of retainer 10-2. It will thus be seen that with the construction shown in FIG. 12, adjustable retainers 10 may be secured permanently to floor 7 of the car and may be accommodated out of the way in recesses 188 when not in use. It will be observed that when retainers 10 are accommodated in recesses 188, flange 18, 21 of members 12, 14 present a flat surface generally forming a continuation of floor 7.

Figure 13:
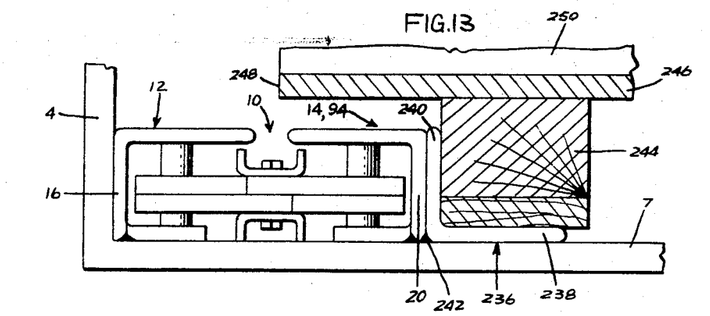
FIGS. 13 through 16 are fragmentary, cross-sectional views showing attachments which may be added to any of the embodiments of the invention to accommodate different types of loads.

Referring now to FIGS. 13 through 17 in which like elements are still indicated by like reference numerals, there are shown several attachments which may be employed with any of the previously described embodiments of the adjustable retainer of the invention for bracing different types of loads. Referring specifically to FIG. 13, adjustable retainer 10 is shown supported on floor 7 of a vehicle or container with flange 16 of member 12 engaging side wall 4. Elongated angle member 236 has its flange 238 resting upon floor 7 and its flange 240 secured to side flange 20 of elongated member 14, or members 94, as by welding at 242. Skid 244 of conventional pallet 246 is supported on flange 238 and abuts flange 240, it being observed that side edge 248 of pallet 246 overhangs member 14 or 94. It will be seen that the weight of load 250 carried by pallet 246 maintains adjustable retainer 10 on floor 7 so that it is not necessary to secure member 12 to wall 4.

Figure 14:
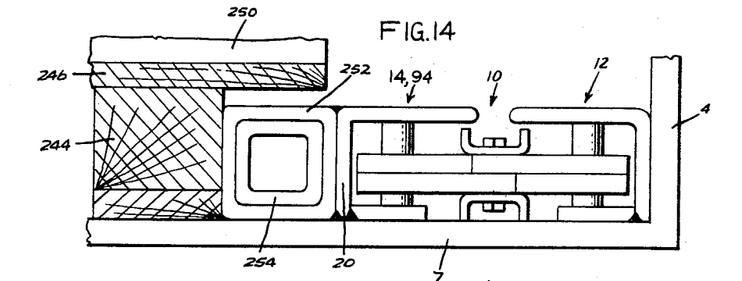
Figure 15:
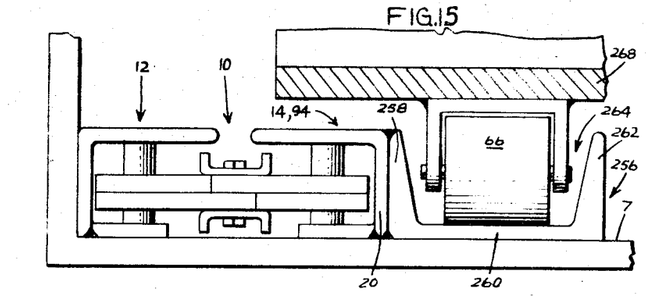

Referring now to FIG. 14, elongated tubular member 252 may be secured to flange 20 of member 14 or members 94, as by welding as shown, tubular member 252 in turn engaging skid 244 of pallet 246. An inner tube 254 may be telescoped within tubular member 252 for spanning a doorway, as shown in FIG. 7.

referring now to FIG. 15, an elongated channel member 256 may have its side flange 258 secured to flange 20 of member 14 or members 94, as by welding as shown. Web portion 260 of channel member 258 rests upon floor 7 and with the other side flange 262 defines an elongated track 264 for receiving wheels or rollers 266 which support load 268.

Figure 16:
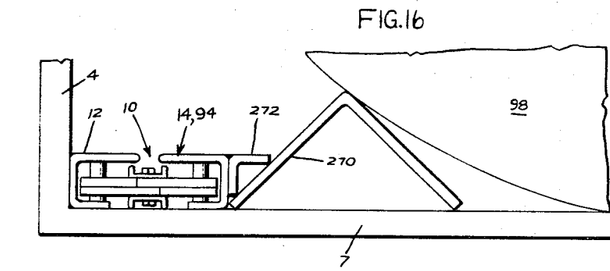

Referring now to FIG. 16, an elongated, inverted angle member 270 may be secured to member 14 or members 94 by a smaller angle member 272 and weldments, as shown. Angle member 270 may thus be employed for bracing a large cylindrical load, such as coil 98.

Figure 17:
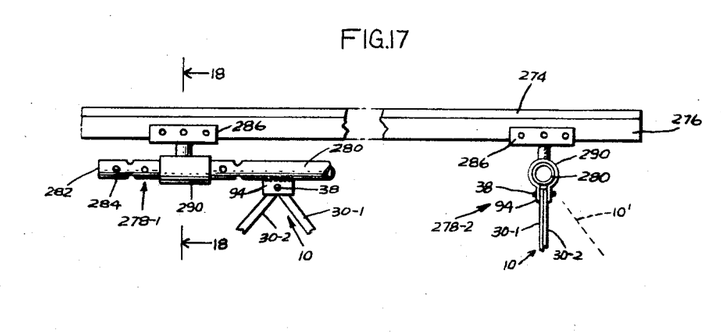
FIG. 17 is a fragmentary view illustrating a fixture which may be employed for adjustably attaching any of the embodiments of the invention to a stringer or other load bracing element.
Figure 18:
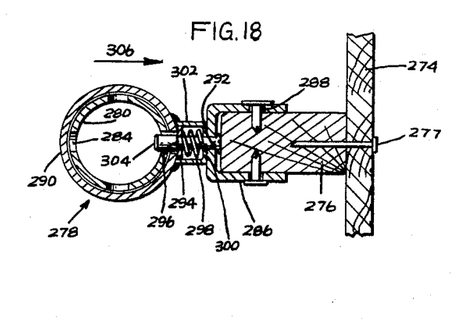
FIG. 18 is a cross-sectional view taken along the line 18—18 of FIG. 17.

Referring now to FIGS. 17 and 18, there is shown a bulkhead or wall 274 adapted to brace and/or retain a load (not shown). Bulkhead 274 has wood stringer 276 attached thereto, as by nails 277. Fixture 278 is provided for adjustably attaching retainer assembly 10 to stringer 276 in any desired position, such as in parallel relationship with stringer 276 as shown in the case of fixture 278-1 in FIG. 17, or at right angles with respect to stringer 276 as shown in the case of fixture 278-2. Here, links 30-1, 30-2 have their outer ends pivotally connected by pivot pin 38 to channel member 94 which, in turn, is secured to elongated tube 280, as by welding. End 282 of the tube 280 has a plurality of axially and angularly spaced openings 284 formed therein.

Fixture 278 comprises a channel member 286 adapted to embrace stringer 276 and to be secured thereto, as by nails 288. Sleeve 290 receives tube 280 and is pivotally mounted on channel 286 by pin 292. Thus, sleeve 290 may be pivoted to dispose tube 280 and adjustable retainer 10 in any desired relationship with respect to stringer 276, such as horizontally as shown in the case of fixture 278-1, or vertically as shown in the case of fixture 278-2.

Washer 294 engages shoulder 296 on pin 292 and spring 298 is disposed between washer 294 and bottom 300 of cup-shaped member 302 which is secured to tube 290, as by welding. Spring 298 thus biases tube 290 toward channel 286 so that end 304 of pin 292 enters a selected opening 284 in tube 280. Thus, by holding sleeve 290 and pulling channel 286 in the direction shown by arrow 306 away from sleeve 290 thus compressing spring 298, pin end 304 will be withdrawn from the particular opening 284 permitting sleeve 290 to be rotated about its axis and/or moved axially with respect to tube 280, pin end 304 engaging a different opening 284 in tube 280 upon release of channel 286. Thus, adjustable retainer 10 may be disposed at an angle with respect to stringer 276, as indicated in dashed lines at 10' in FIG. 17. It will now be seen that the adjustable fixture 278 permits connection of adjustable retainer 10 to a stringer or other bracing element 276 at convenient points thereon, and further permits adjustable retainer 10 to be disposed in a number of different relationships with respect to stringer 276.

It will be understood that a pair of mechanisms 10 may be provided vertically disposed (in the manner shown in FIG. 17) each having a plurality of fixtures 278 on its tube 280, corresponding fixtures 278 being interconnected by horizontally extending, vertically spaced-apart stringers 276 which may abut the pallet stringers or skids of double or triple decked pallet loads so as to permit longitudinal shifting of the loads while inhibiting lateral shifting.

Figure 19:
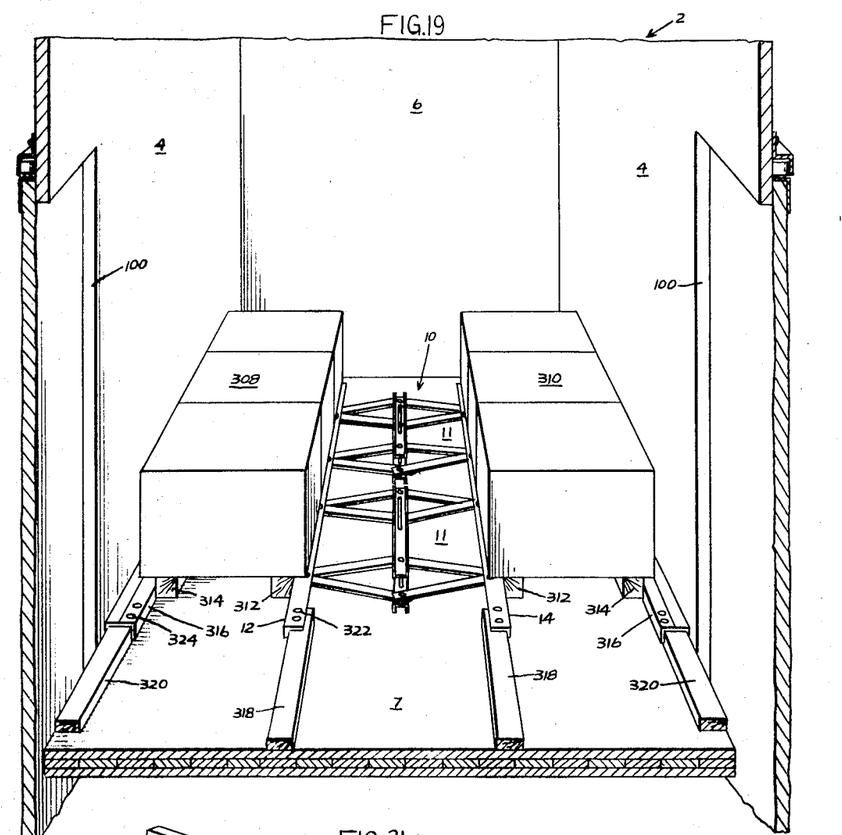
FIG. 19 is a view in perspective showing another method of bracing loads in a conventional railroad boxcar employing the embodiment of FIGS. 1 through 5.

Referring now to FIG. 19 in which like elements are still indicated by like reference numerals, here the locked embodiment of adjustable retainer 10 of FIGS. 1 through 5 is employed for rigidly bracing loads 308, 310 against opposite sides 4 of freight car 2. Loads 308, 310 are shown supported on longitudinally extending stringers 312, 314. Stringers 314 respectively abut channel irons 316 supported on floor 7 which, in turn, abut side walls 4. Members 12, 14 of adjustable retainer 10 respectively abut stringers 312 thus rigidly bracing loads 308, 310 against side walls 4. If desired, wood stringers may be employed for spanning door openings 100, stringers 318 being secured to members 12, 14 in any suitable manner, as by nails 322, and stringers 320 similarly being secured to channel irons 316, as by nails 324.

Figure 20:
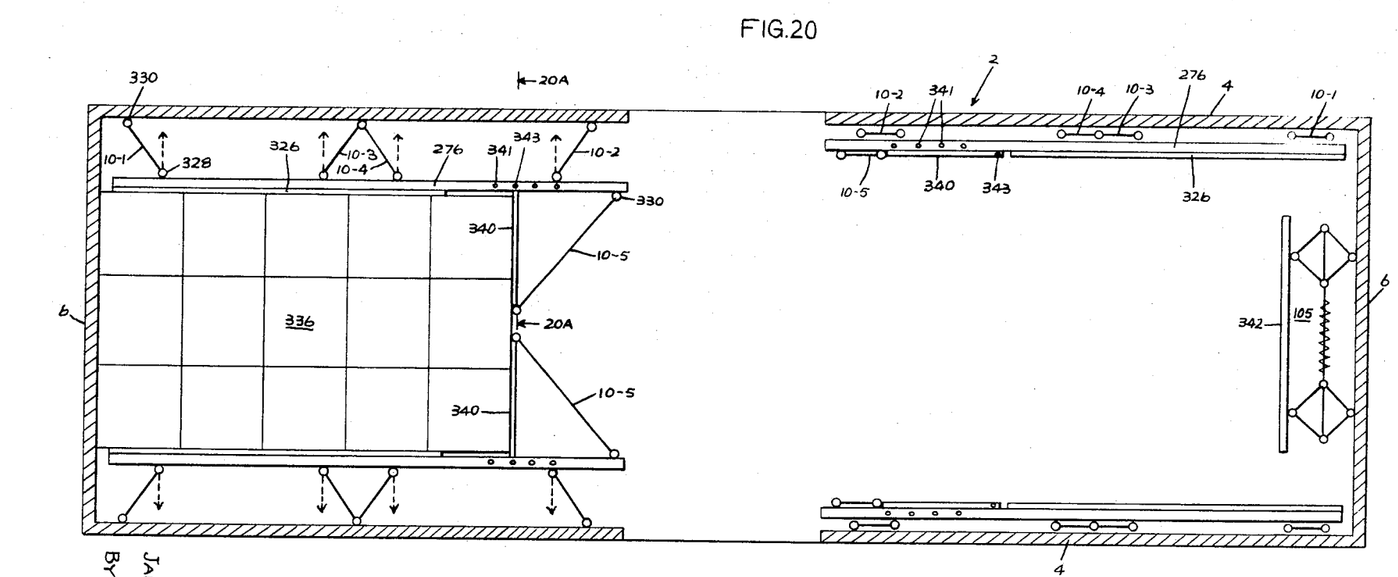
FIG. 20 is a top cross-sectional view of a conventional railroad freight car illustrating a system for bracing a load employing the adjustable retainers of the invention.
Figure 20A:
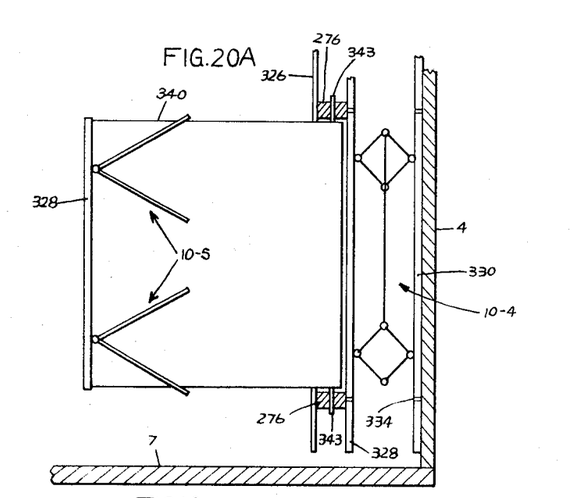
FIG. 20a is a cross-sectional view taken generally along the line 20a—20a of FIG. 20.
Figure 21:
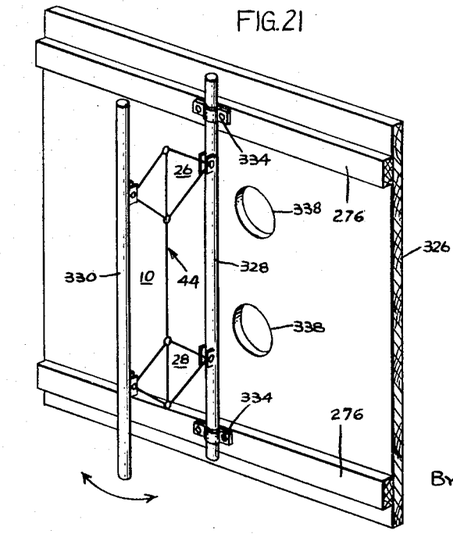
FIG. 21 is a fragmentary view in diagrammatic perspective further illustrating the bracing system of FIG. 20.

Referring now to FIGS. 20, 20A and 21, there is shown diagrammatically a system employing the adjustable retainers of the invention which is particularly suited for use in bracing a commodity which does not completely fill a car and/or in instances where the weight of the load precludes filling of the car. Here, vertical, movable walls 326 are provided parallel with side walls 4 of car 2, walls 326 being formed of suitable material, such as plywood. Walls 326 are movably connected to side walls 4 by a plurality of upstanding retainers 10 which may be either the locked embodiment of FIGS. 1 through 5, the spring-loaded embodiment of FIGS. 8 and 9, or the embodiment of FIGS. 22 and 23 to be hereinafter described.

Each of the adjustable retainers 10 comprises a pair of elongated, rigid tubular members 328, 330 (in place of the angle irons 12, 14) having toggle linkages 26, 28 respectively pivotally connected thereto, as above described. A pair of longitudinally extending wood stringers 276 (FIGS. 20A, 21) are attached to the outer surface of each wall 326 and tubular members 328 are pivotally attached thereto, as by means of suitable brackets 334, or fixtures 278 of the type shown in FIGS. 17 and 18 and described above. Tubular members 330 are similarly pivotally attached to the inner surface of walls 4. Thus, inward movement of walls 326 toward load 336 results in extension of adjustable retainers 10 and also in outward pivotal movement thereof away from walls 4, whereas outward movement of walls 326 toward walls 4 (see left side of FIG. 20) results in collapse of retainers 10 and inward pivotal movement thereof toward walls 4, to the position shown on the right hand side of FIG. 20. It will be observed that walls 326 cannot move in the fore and aft direction by virtue of the angular positioning of the end retainers 10-1, 10-2 and the center retainers 10-3, 10-4. Suitable openings 338 (FIG. 21) in walls 326 afford access to adjustable retainers 10 for locking and unlocking the retainers 10, or for actuating the spring-collapsing handle member 146 of the spring-loaded retainer of FIGS. 8 and 9, or for operating the ratchet mechanism of the retainer of FIGS. 22 and 23.

Movable or floating bulkheads 340 may be employed for longitudinally bracing load 336 against end wall 6. Bulkheads 340 have their inner ends adjustably secured between stringers 276 by spring-biased pins 343 seated in selected openings 341 in stringers 276. Bulkheads 340 are braced in engagement with load 336 by means of horizontal adjustable retainers 10-5 extending between their outer ends and walls 326 and being respectively pivotally secured thereto by tubular members 328, 330, as shown and as above described. As shown on the right hand side of FIG. 20, when pins 343 are disengaged from openings 341 in stringers 276 and retainers 10-5 are collapsed, bulkheads 340 may be pivoted to a position flush with walls 326. If it is desired to employ the system shown in FIG. 20 with a floating load, one or more springloaded retainers 105 of the type shown in FIGS. 8 and 9 may be employed positioned between end walls 6 and movable end walls 340, as shown on the right hand side of FIG. 20.

Figures 22, 23:
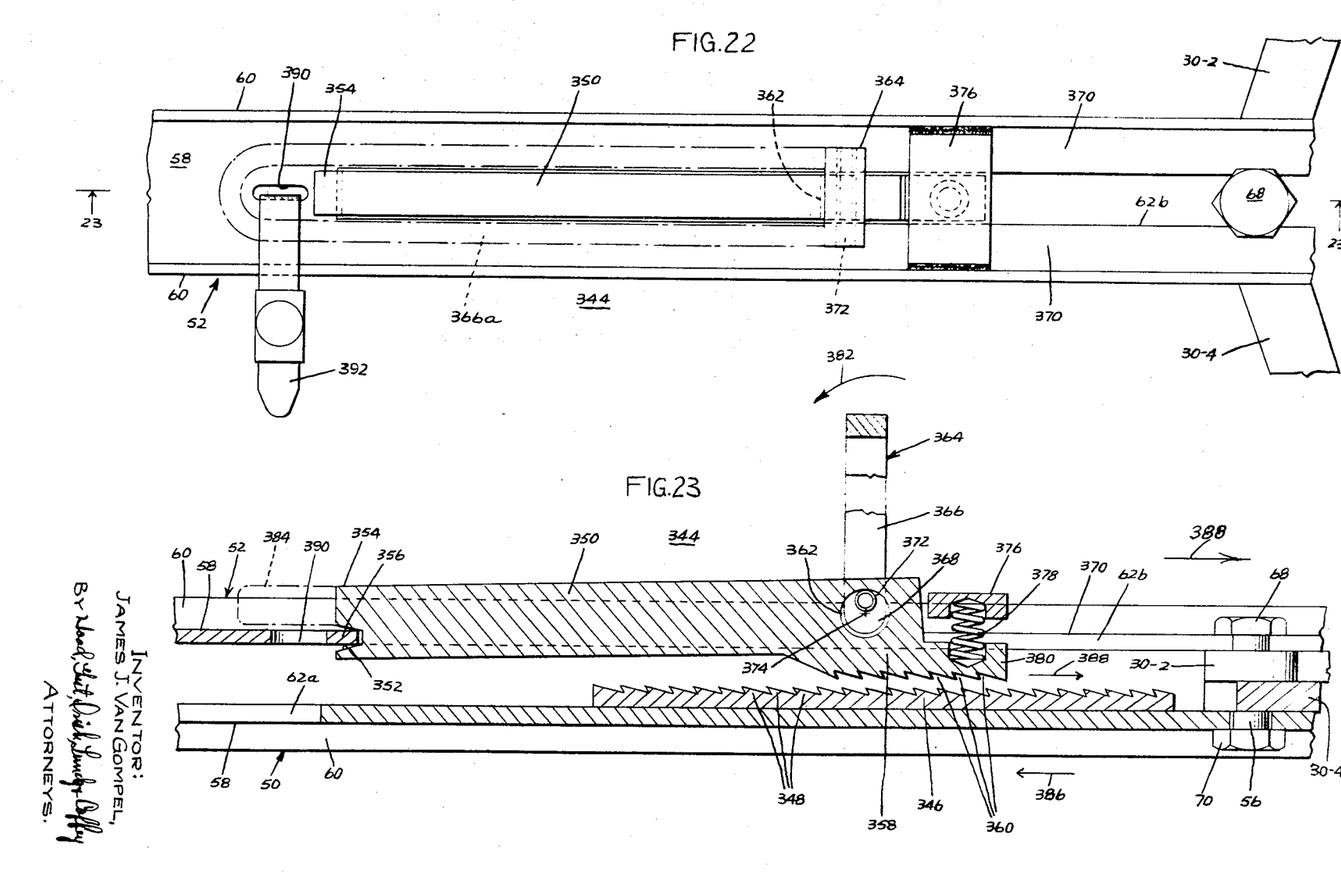
FIG. 22 is a fragmentary top view illustrating a modification of the embodiment of FIGS. 1 through 5 incorporating a ratchet device for releasably locking the mechanism.
FIG. 23 is a fragmentary sectional view taken along the section line 23—23 of FIG. 22.

Referring now to FIGS. 22 and 23, there is shown a ratchet device 344 which may be added to the embodiment of FIGS. 1 through 5 for releasably locking the mechanism. Here, an elongated element 346 having ratchet teeth 348 thereon is secured to web portion 58 of guide element 50, as by welding. Dog 350 is positioned in slot 62b of guide element 52 (which may be lengthened if required) and has notch 352 in its forward end 354 pivotally engaging web portion 356 which defines the end of slot 62b. Dog 350 has portion 358 with ratchet teeth 360 thereon. Dog 350 has a transverse opening 362 formed therethrough.

An elongated, generally U-shaped handle member 364 is provided having arms 366 terminating in curved lower ends 368 which engage portions 370 of web portion 58 of guide element 52 on either side of slot 62b. Roll pin 372 extends transversely through opening 362 and is secured to arms 366 of handle member 364, roll pin 372 being eccentric with respect to the center of curvature 374 of curved ends 368 of arms 366. Plate 376 extends between flanges 60 of guide element 52 being secured thereto, as by welding as shown. Spring 378 extends between plate 376 and rear end 380 of dog 350 thereby tending to bias dog 350 downwardly so that its ratchet teeth 360 engage ratchet teeth 348.

It will be observed that when handle member 364 is positioned vertically as shown in FIG. 23, rounded ends 368 of legs 366 engage web portions 370 and roll pin 372 engages the upper surface of hole 362 in dog 350 thereby pivoting dog 350 upwardly against the force exerted by spring 378 so as to disengage ratchet teeth 360 from ratchet teeth 348. When handle member 364 is pivoted downwardly in the direction shown by arrow 382 to the position shown in dashed lines at 366a (FIG. 22), spring 378 pivots dog 350 downwardly so that ratchet teeth 360 engage ratchet teeth 348. Reference to FIG. 23 will now reveal that any force tending to move members 12, 14 toward the collapsed position will result in a tendency for guide element 50 to move in the direction shown by the arrow 386 and for guide element 52 to move in the direction shown by the arrow 388, such relative movement, however, being positively restrained by engagement of ratchet teeth 348, 360 thereby positively locking the mechanism in its expanded position.

There are instances when it is desirable for the shipper to provide a seal which will indicate to the consignee of the goods that the same have not been tampered with or jostled in transit. Such a seal may be provided by passing a banding seal 392 through opening 390 in web portion 58 of guide element 52 and around one arm 366a of handle member 364 in its lowered position. Thus, upon receiving the goods braced by the adjustable retainer 10 of the invention utilizing the ratchet device 344, the presence of an unbroken seal 392 indicates to the consignee that the retaining device has not been tampered with in transit.

It will not be seen that an adjustable load retainer incorporating the parallel motion mechanism of the invention may be employed for blocking and/or bracing a wide variety of loads in various manners as dictated by the nature and characteristics of the particular load. Thus, certain loads may be rigidly side-braced with the locked embodiment of the invention shown in FIGS. 1 through 5 with the load being permitted to float longitudinally. Longitudinal floating of the load may be resiliently restrained and/or limited by the spring-loaded embodiment of FIGS. 8 and 9 or FIGS. 11 and 12. Self-centering and self-aligning of certain loads may be provided by side bracing with the spring-loaded embodiment of FIGS. 8 and 9. Either the locked embodiment or the spring-loaded embodiment of the invention may be incorporated in a variety of systems, such as that shown in FIGS. 20 and 21, for in essence providing a reduced-volume cargo compartment for packaged or bulk commodities.

It will be seen that the several embodiments of the adjustable load retainer of the invention are easily installed and removed thus substantially reducing the time previously required for assembling and disassembling conventional wooden blocking and bracing, this in turn substantially reducing the down-time of the car and demurrage charges. Further, use of the adjustable load retainers of the invention substantially eliminates damage to the floor and/or walls of the vehicle previously caused by repeated nailing of wooden blocking and bracing thereto. The adjustable load retainers of the invention may be of rugged construction and thus may be employed for many shipments, thus in turn effecting great savings in the cost of wooden dunnage previously scrapped after one shipment.

It will also be seen that the improved parallel motion mechanism of the invention may be employed for uses other than an adjustable retainer. The parallel motion mechanism may be employed for mounting a variety of devices or elements which require movement in rectilinear fashion. For example, the mechanism may be employed for mounting sliding doors, partitions, camper tops, and the like.

While there have been described above the principles of this invention in connection with specific apparatus, it is to be clearly understood that this description is made only by way of example and not as a limitation to the scope of the invention.

What is claimed is:

1. A parallel motion mechanism comprising a pair of spaced toggle linkages, each of said linkages comprising four link elements of equal lengths pivotally connected together at first and second opposite pivot points and at third and fourth opposite pivot points to form a parallelogram, a first elongated rigid element interconnecting said first pivot points of said linkages for movement in unison, a second elongated rigid element equal in length to said first element interconnecting said second pivot points of said linkages for movement in unison, means for connecting said third pivot points to a first rigid structure, and means for connecting said fourth pivot points to a second rigid structure, said first and second pivot points being located on a first imaginary straight line and said rigid elements extending in parallel, overlapping relationship on said first line and colinearly moving therealong between retracted and extended positions in response to extension and collapse of said linkages, respectively, whereby said third and fourth pivot points are respectively located on second and third imaginary straight lines spaced on opposite sides of said first line and parallel therewith in all positions of said linkages.

2. The mechanism of claim 1 wherein said first and second structures include rigid elements, and further comprising means for releasably securing any two adjacent ones of said elements against movement thereby selectively to lock said linkages in any one of an infinite number of angular positions.

3. The mechanism of claim 1 further comprising resilient means acting upon said linkages for biasing said linkages toward their fully extended positions.

4. The mechanism of claim 1 wherein each of said rigid structures includes an elongated flange having an edge, said edges abutting and said flanges covering said linkages when said linkages are collapsed.

5. The mechanism of claim 1 further comprising means for releasably clamping said rigid elements thereby to restrain said extension and retraction thereof whereby said linkages may be locked in any of an infinite number of angular positions.

6. The mechanism of claim 1 further comprising ratchet means cooperating with said rigid elements for restraining collapse from a selected extended position, said ratchet means permitting said retraction of said rigid elements and extension of said linkages, and means for selectively disengaging said ratchet means thereby permitting free extension of said elements and collapse of said linkages.

7. The mechanism of claim 1 wherein each of said rigid elements has an elongated slots therein,; a first pivot member connected to one a said rigid elements, extending through said slot in the other of said rigid elements, and forming one of said first pivot points; and a second pivot member connected to said other rigid element, extending through said slot in said one rigid element, and forming another one of said second pivot points.

8. The mechanism of claim 7 wherein each of said rigid elements has opposite ends, said first and second pivot members being respectively connected to said one and other rigid elements adjacent one end thereof, and further comprising third and fourth pivot members respectively connected to said one and other elements adjacent the other ends thereof and respectively forming the remaining ones of said first and second pivot points.

9. The mechanism of claim 8 wherein each of said rigid elements comprises a channel member having a web portion and opposite side flanges, said web portions being in spaced, parallel relationship with said flanges respectively facing outwardly in opposite directions, said link elements which are pivotally connected by said first and second pivot members having ends positioned between said web portions, said slots being formed in said web portions.

10. The mechanism of claim 7 wherein said pivot members respectively comprise threaded fasteners for releasably clamping said rigid elements thereby to restrain said extension and retraction thereof whereby said linkages may be locked in any one of an infinite number of angular positions.

11. The mechanism of claim 7 wherein said rigid elements have portions extending in overlapping relationship between said first and second pivot members, and further comprising spring means surrounding said overlapping portions, said spring means extending between said linkages and engaging the link elements thereof which are pivotally connected by said first and second pivot members, respectively, for resiliently urging said linkages toward their fully extending positions.

12. The mechanism of claim 11 further comprising a tubular sleeve surrounding said rigid elements and spring means and having opposite ends respectively extending outwardly beyond said linkages, said sleeve having openings formed therein wtih said link elements respectively extending therethrough, and second and third spring means in said sleeve respectively extending between said ends thereof and said linkages for further resiliently urging said linkages toward said extended positions thereof.

13. The mechanism of claim 11 further comprising means for selectively comprising said spring means thereby to disengage the same from one of said linkages, and means for restraining said spring in a compressed position thereby permitting free collapse and extension of said linkages.

14. The mechanism of claim 13 wherein said compressing means includes a manually actuated lever member carried by said rigid elements.

15. The mechanism of claim 7 further comprising a first ratchet member carried by one of said rigid elements and positioned in said slot thereof, said first ratchet member having a first plurality of longitudinally extending ratchet teeth thereon, a second ratchet member carried by the other of said rigid elements and having a second plurality of longitudinally extending ratchet teeth thereon adapted to cooperate with said first teeth to restrain said extension and permit said retraction of said rigid elements, one of said ratchet members being moveable with respect to the other between teeth engaging and disengaged positions, means for normally resiliently urging said one member to said teeth engaging position thereby locking said linkages against collapse from a selected extended position, and manually actuated means for selectively moving said one member to said disengaged position thereby permitting free collapse of said linkages.

16. The mechanism of claim 1 wherein one of said structures comprises an elongated tubular member, and further comprising means for mounting said tubular member on another element for pivotal movement about the axis of said tubular member whereby the assembly of said linkages and interconnecting means is pivotally movable about said axis.

17. The mechanism of claim 16 wherein said mounting means comprises a sleeve surrounding a portion of said tubular member, said sleeve being rotatably mounted on said tubular member thereby providing said pivotal movement, a mounting member adapted to be secured to said other element, means for pivotally connecting said sleeve to said mounting member, and means for selectively locking said tubular member in a plurality of selected pivotal positions with respect to said sleeve.

18. The mechanism of claim 1 wherein one of said structures comprises an elongated rigid member, a supporting element having a surface with an elongated recess formed therein, and means for connecting said member to said supporting element for pivotal movement of the assembly of said linkages, interconnecting means, other structure and rigid member between a first position with said assembly received in said recess and a second position with said assembly engaging said surface.

19. The mechanism of claim 18 wherein said surface is generally horizontal and said assembly is supported thereon in said second position, said recess being proportioned to receive said assembly only when said linkages are substantially fully collapsed.

20. The mechanism of claim 1 wherein one of said structures comprises a rigid, vertical wall, the respective connecting means being vertically aligned so that all of said lines extend vertically.

21. The mechanism of claim 20 wherein the other of said structures comprises a movable, vertical wall, said movable wall being moved with resepct to said rigid wall by extension and collapse of said linkages, respectively.

22. The mechanism of claim 21 wherein said connecting means respectively connect said third and fourth pivot points to said walls for pivotal movemment of the assembly of said linkages and interconnecting means about said second and third lines, respectively.

23. The mechanism of claim 22 wherein said walls are generally parallel, said assembly forming acute angles with said walls when said linkages are extended and being generally parallel with said walls when said linkages are substantially collapsed.

24. The mechanism of claim 20 wherein the other of said structures comprises a vertical bulkhead movable between a first position generally at right angles to said wall and a second position in closely spaced parallel relationship with said wall, said connecting means respectively connecting said third and fourth pivot points to said wall and bulkhead for pivotal movement of the assembly of said linkages and interconnecting means about said second and third lines, respectively thereby to move said bulkhead between said positions thereof.

25. The mechanism of claim 24 wherein said bulkhead has inner and outer ends, said fourth pivot points being connected to said outer end of said bulkhead, and further comprising releasable means for hingedly connecting said inner end of said bulkhead to said wall at a plurality of selected points thereon thereby to provide a plurality of said first positions, said third pivot points being connected to said wall at a location spaced from said selected points whereby said assembly forms acute angles with said wall and bulkhead in said first positions thereof, release of said releasable means permitting movement of said bulkhead to said second position, said assembly being generally aligned with said bulkhead in said second position thereof.

26. The mechanism of claim 1 further comprising manually actuated means for releasably holding said linkages in extended positions, one of said structures comprising a wall, said wall having at least one opening therein for providing access to said holding means.

* * * * *

UNITED STATES PATENT OFFICE
CERTIFICATE OF CORRECTION

Patent No. 3,754,516   Dated  August 28, 1973

Inventor(s) James J. VanGompel

It is certified that error appears in the above-identified patent and that said Letters Patent are hereby corrected as shown below:

IN THE CLAIMS

Claim 6, Col. 14, line 25,  --said extension thereof thereby locking said linkages against -- should be inserted after "restraining"

Signed and sealed this 19th day of March 1974.

(SEAL)
Attest:

EDWARD M. FLETCHER, JR.
Attesting Officer

C. MARSHALL DANN
Commissioner of Patents